United States Patent [19]
Okuyama et al.

[11] Patent Number: 5,455,824
[45] Date of Patent: Oct. 3, 1995

[54] MESSAGE INFORMATION TERMINATING SYSTEM

[75] Inventors: Yuzo Okuyama; Satoshi Kakuma; Yasunori Tonooka, all of Kawasaki; Megumi Shibata, Yokohama, all of Japan

[73] Assignee: Fujitsu Limited, Kanagawa, Japan

[21] Appl. No.: 132,044

[22] Filed: Oct. 5, 1993

[30] Foreign Application Priority Data

Oct. 5, 1992 [JP] Japan ..................................... 4-265722

[51] Int. Cl.⁶ .............................. H04J 3/12; H04Q 11/04
[52] U.S. Cl. ..................... 370/56; 370/68.1; 370/105.5; 370/110.1; 370/112; 379/333; 379/350
[58] Field of Search ........................... 370/56, 58.1, 58.2, 370/58.3, 68.1, 110.1, 112, 13, 17, 105.1, 105.4, 105.5; 379/333, 350; 371/48

[56] References Cited

U.S. PATENT DOCUMENTS

| | | | |
|---|---|---|---|
| 4,245,340 | 1/1981 | Landry | 370/111 |
| 4,398,284 | 8/1983 | Canniff | 370/56 |
| 4,550,404 | 10/1985 | Chodrow et al. | 370/110.1 |

FOREIGN PATENT DOCUMENTS 4119740   4/1992   Japan .

Primary Examiner—Hassan Kizou

[57] ABSTRACT

A message information terminating system in a switching center is connected to a plurality of remote stations by Derived Data Link interfaces and includes transmission lines connected to the same data terminal unit of the switching center, for transmitting message information containing various information such as subscriber information with communication data by framing bits between the switching center and each of said remote stations, and a message terminating equipment provided with a processing unit for analyzing the message information and disposed in a network at the switching center. The data terminal unit collects the message information from a plurality of the remote stations and transmits the message information to the message terminating equipment through the network. The message terminating equipment separates the message information from each of the remote stations, analyzes the message information, using the processing unit, and sends normal message information to a control processor in the switching center when the message terminating equipment detects a normal message.

6 Claims, 9 Drawing Sheets

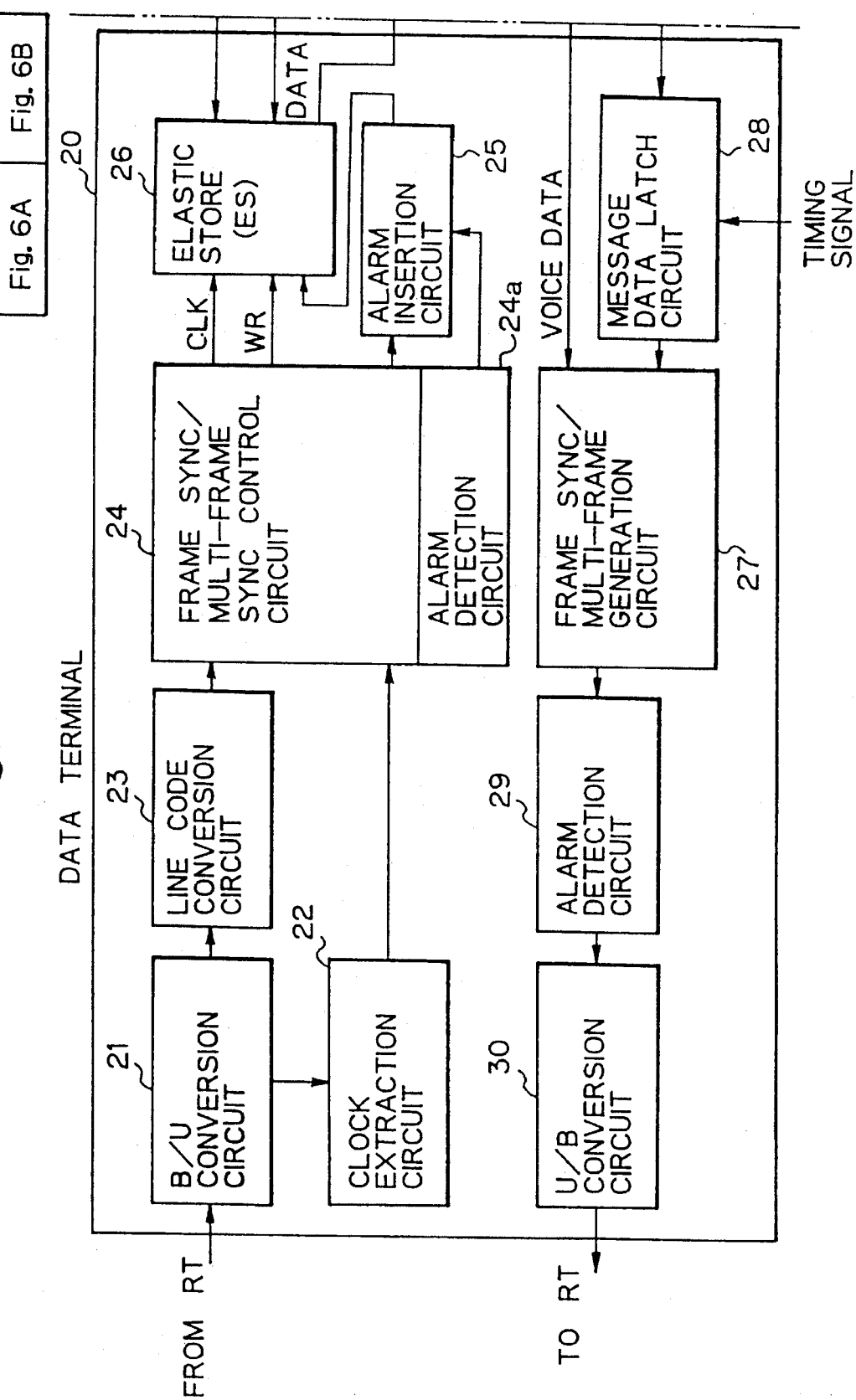

Fig. 7

| Frame No. | B1 | B2 | B3 | B4 | B5 | B6 | B7 | B8 |
|---|---|---|---|---|---|---|---|---|
| 0 | DT1 MESSAGE BIT | DT2 MESSAGE BIT | DT3 MESSAGE BIT | DT4 MESSAGE BIT | DT5 MESSAGE BIT | FIRST BIT | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |

MESSAGE INFORMATION TERMINATING SYSTEM

BACKGROUND OF THE INVENTION

1. Field of the Invention

The present invention relates to a message bit terminating system in an SLC96 interface used between remote stations and a switching center according to U.S. standards.

2. Description of the Related Art

In the US, the ratio of direct convention of subscribers' line to a switching center (CO station: central office) is low. Since houses are dispersed in a wide area, a large number of subscriber lines are connected at a remote station (RT station), and an interface for connecting these remote stations to the switching center is stipulated as a standard. This standard is referred to as LSSGR (LATA Switching System Generic Requirement where LATA is an abbreviation for Local ACCESS TRANSPORT Area).

The LSSGR standard stipulates a communication interface, using time division multiplexing, called the SLC96 Interface, as an interface between the RT stations and the CO station. According to the SLC96 interface standard, messages such as connection control information, alarm information, switching control information for fault conditions, and so forth, are exchanged between the CO station and the RT stations together with speech signals. Therefore, efficient processing of this message information is desired.

The connection network type to which the conventional LSSGR standard is applied in the US is the type where a plurality of remote stations (RT) are connected to the switching center (CO). The switching center is able to effect the exchange of messages by using a time-division multiplexing digital switch. The remote station accommodates 96 subscriber terminals or 48 subscriber terminals, for example, and the SLC96 standard is stipulated for the interface at the switching center so as to effect time-division multiplex transmission of digital signals. A subscriber line to each remote station can be connected to and communicate with a subscriber line directly connected in the switching center or a subscriber line at other remote station or a subscriber line at an other switching center through the switching center.

When the subscriber connection procedure information is processed in a 9 ms cycle by the software in the SLC96 interface, as described above, there exists the problem that the load on the processor increases when the number of the SLC96 interfaces accommodated in the switching center increases.

When the message processing described above is executed by the data terminal DT (or by the DT controller DTC) at the switching center, a microprocessor becomes necessary and, in this case too the number of microprocessors increases when the number of the SLC96 interfaces connected to the system increases, so that the system cost increases.

SUMMARY OF THE INVENTION

It is an object of the present invention to provide a message information terminating system in the SLC96 interface which can reduce the load on the control processor by efficiently processing the message information at the SLC96 interface, as described above, and can also reduce the cost of the system.

In accordance with an aspect of the present invention, there is provided a message information terminating system in each switching center connected to a plurality of remote stations by SLC96 interfaces, the system including: a transmission line for transmitting message information containing various information such as subscriber information and communication data, by framing bits, between said switching center and each of said remote stations, is contained in the same data terminal unit at said switching center; and a message terminating equipment provided with a processing unit for analyzing said message information is disposed in a network at said switching center, wherein said data terminal gathers said message information from a plurality of said remote stations and transmits said message information to said message terminating equipment through said network; and wherein said message terminating equipment separates said message information from each of said remote stations, analyzes said message information by said processing unit, and passes normal message information to a control processor of said switching station when said message terminating equipment detects said normal message.

As to the subscriber connection information (at each 9 ms cycle) in the message information, the present invention makes the report when the third message (at each 27 ms) is normally received. Therefore, since the processing cycle of the software by the control processor that has been executed in the 9 ms cycle according to the prior art can be extended to the 27 ms cycle, the present invention can reduce the load on the processor.

In comparison with the case where the processing function (microprocessor) is provided at each data terminal controller (DTC) for individual processing, the present invention can gather the processing functions and allot them to only the message terminating equipment. Accordingly, the present invention can reduce the number of microprocessors (to ⅕ when five DTCs are installed), and can provide a system economically.

BRIEF DESCRIPTION OF THE DRAWINGS

FIGS. 6A and 6B denote a block diagram showing an embodiment of DT and DTC in a switching center in accordance with the present invention;

FIG. 7 is the format of the interface between the DTC and a terminating equipment;

DESCRIPTION OF THE PREFERRED EMBODIMENTS

A comparison between a conventional device and the present invention will now be made with reference to the attached drawings.

In the US, the ratio of direct connection of subscribers' line to a switching center (CO station or central office) is low. Since houses are dispersed in a wide area, a large number of subscribers are connected to a remote station (RT station), and an interface for connecting these remote stations to the switching center is stipulated as a standard. This standard is referred to as LSSGR (LATA Switching System Generic Requirement TR-TY-000008 and the term LATA is the abbreviation of Local ACCESS TRANSPORT Area).

This standard stipulates a communication interface, using time division multiplexing, called on SLC96 interface between the RT stations and the CO station. According to this standard, messages such as connection control information, alarm information, switching control information for fault conditions, and so forth, are exchanged between the CO station and the RT stations together with speech signals. Therefore, efficient processing of this message information has been desired.

Figure 1:
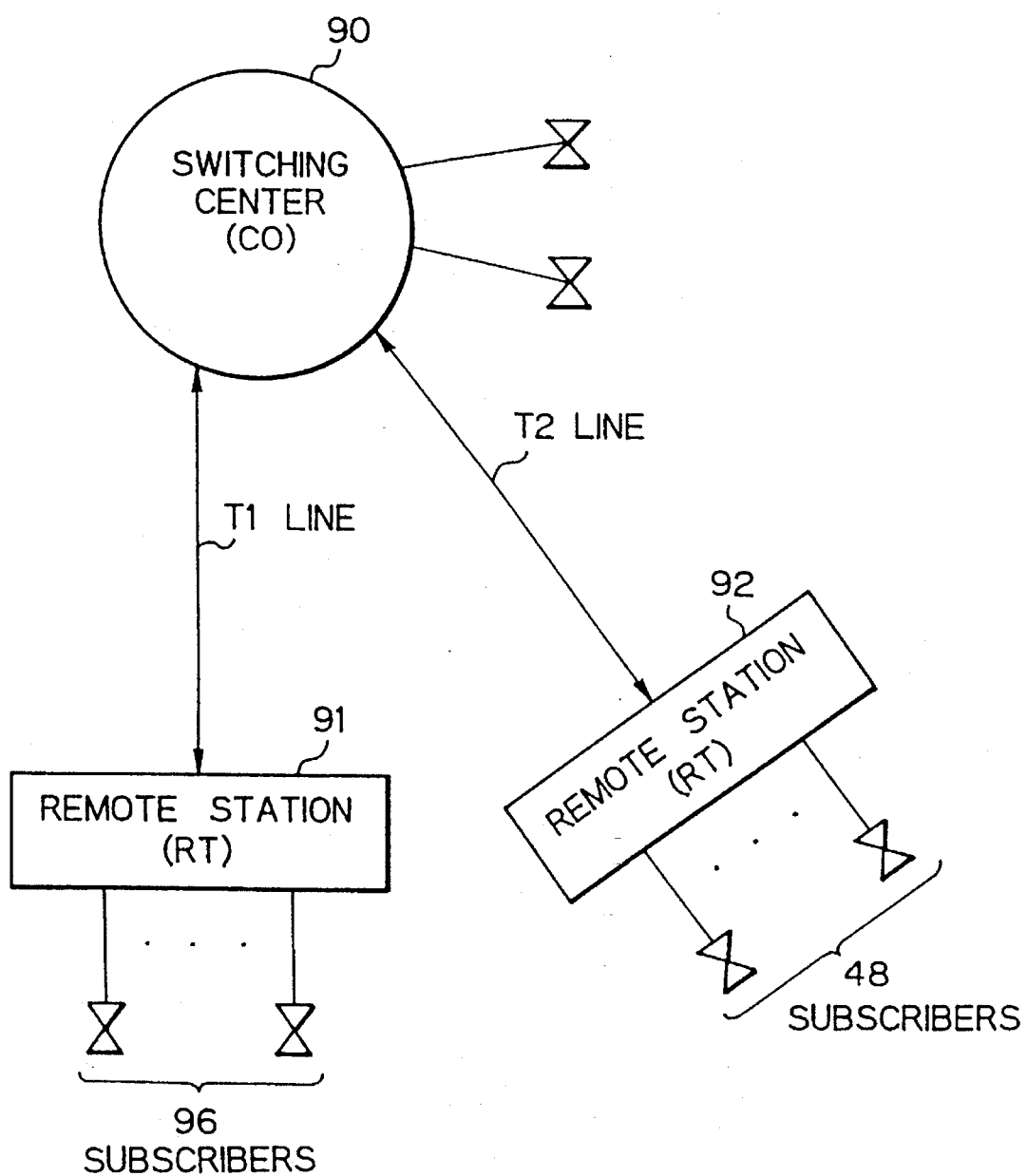
FIG. 1 is a schematic diagram showing connections between remote stations and a switching center according to the prior art.
Figure 3A:
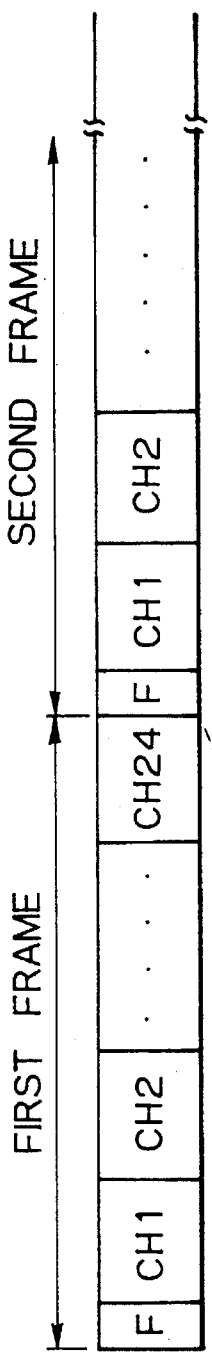
FIGS. 3A to 3C are views showing a frame structure at the SLC96 interface.
Figure 3B:
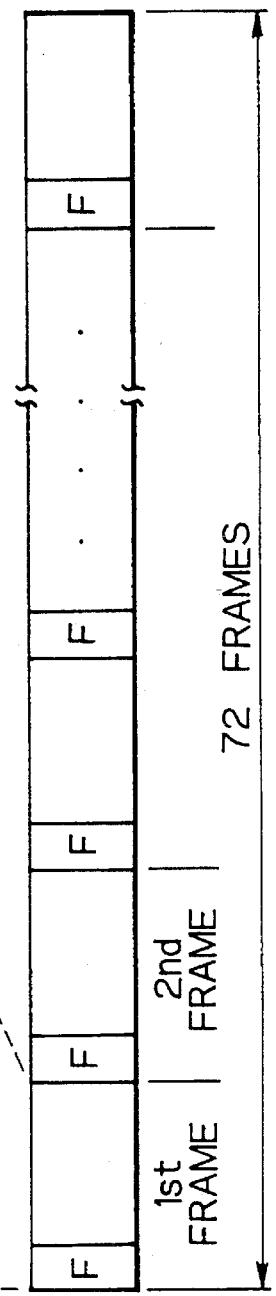
Figure 3C:
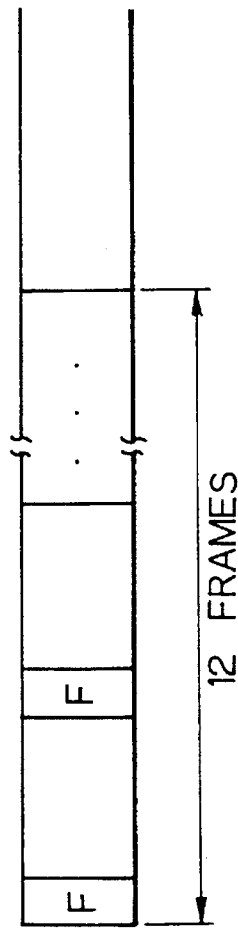
Figure 4:
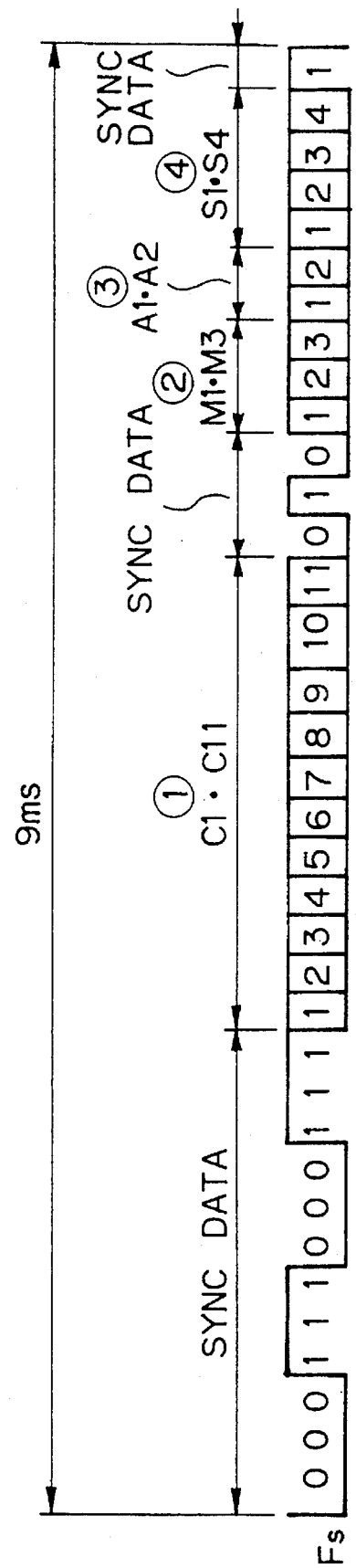
FIG. 4 is a view showing the Fs bit format of framing bits.

FIG. 1 is an explanatory view of connections between the remote stations and the switching center according to the prior art, FIG. 3 is an explanatory view of a frame structure of the SLC96 interface, and FIG. 4 shows a format of framing bits.

The connection network type to which the conventional LSSGR standard is applied in the US due those where a plurality of remote stations (RT) 91 are connected to the switching center (CO) 90 as shown in FIG. 1. The switching center 90 effects information exchange by time-division digital switchs. The remote station 91 accommodates 96 subscribers or 48 subscribers (not shown), for example, and the SLC96 standard is stipulated for the interface with the switching center 90 so as to effect time-division multiplexed information transmission by digital signals. A subscriber to each remote station 91 can be connected to and communicate with a subscriber directly connected to the switching center 90 or a subscriber at another remote station or a subscriber at another switching center (not shown) through the switching center 90.

Figure 2:
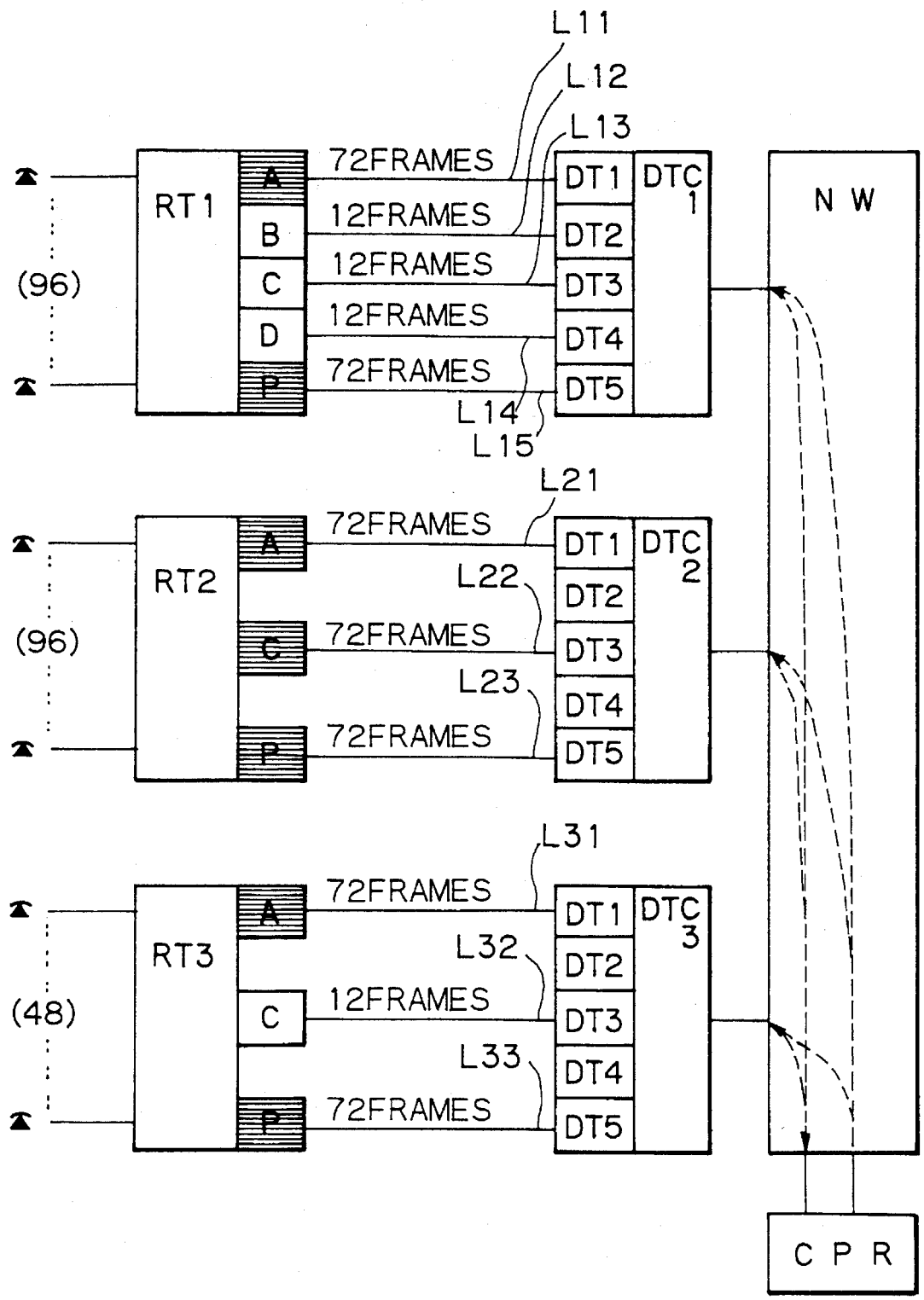
FIG. 2 is a view of connections between an SLC96 interface and a switching center.

FIG. 2 shows the connections between the SLC96 interface and the switching center. In FIG. 2, symbols RT1 to RT3 represent the remote stations, A to D and P represent digital terminals at the remote station side, DT1 to DT5 represent the digital terminals disposed on the switching center side, DTC1 to DTC3 represent DT controllers for exchanging control information with a CPR by controlling the DTs corresponding to the respective remote stations, NW represents a network for effecting digital switching, and CPR represents a control processor (CPR Call Processor) which receives condition information and connection information from each subscriber and makes various adjustments such as switching control to a spare line.

The SLC96 interface standard includes three modes of connection between the remote stations and the switching center as shown in FIG. 2, and five transmission lines L11 to L15 are disposed between the remote station RT1 and the DTC1 on the switching center side opposing the former. Each of these lines is a transmission line using a known PCM 24-channel multiplexing transmission system referred to as a "T1 line".

However, L11 (corresponding to DT indicated by A on the side of RT1 side) and L15 (corresponding to DT indicated by P) are transmission lines using a 72-frame multi-frame structure, and lines L12 to L14 (corresponding similarly to DTs indicated by B, C and D) are transmission lines using a 12-frame multi-frame structure. By the way, line L15 is a spare line provided in the case of trouble on other lines, and symbol P means protection.

In the case of the mode 1, 96 subscribers are accommodated in RT1 and the number of channels in the transmission line is 24×4 (exclusive of the spare)=96 channels. In other words, one channel is allotted to each of the subscribers connected to the switching center, and connection on a 1:1 basis is established.

In contrast with mode 1, mode 2 connections are used in the case of RT2, and the transmission lines L21 to L23 are connected by T1 lines using a 72-frame structure. However, L23 is a spare transmission line. In this case, since the total numbers of channel in the two transmission lines L21 and L22 is 48, 96 subscribers are connected by the RT2 on the 2:1 basis. RT3 represents an example of a mode 3 connection. In this case, the transmission line L31(A) and the spare of the line L33(P) use the 74-frame structure and the transmission line L32 uses the 12-frame structure. The number of subscribers an RT3 is 48, and the number of channels in the transmission line is also 48. Therefore, connections are established on the 1:1 basis. This mode is used for accommodating digital subscribers.

The frame formats of the transmission lines L11, L21, L22, L31 and spare transmission lines P of each of the lines L15, L23, L33 using the 72-frame structure and the transmission lines using the 12-frame structure will be explained with reference to FIG. 3.

FIG. 3A shows the structure of one frame, and an F (frame) bit of one bit is disposed at the leading part. After this F bit, signals 24 channels of voice PCM signals that is CH1 to CH24 are disposed. FIG. 3B shows the 72-frame structure. The F bit at the leading part of each frame transmits the framing bits shown in next FIG. 4 by 72 frames. FIG. 3C shows the 12-frame structure, and a fixed sync pattern represented by 12 frames is stored in the leading F bits.

FIG. 4 shows an Fs-bit-format of the framing bit. As shown in FIG. 3B, it is transmitted by the F bit of the 72-frame structure. The first 12 bits (F bits for 12 frames), the intermediate 3 bits and the last 1 bit are sync data, and are set to the fixed pattern as shown in the format. The following information are stored between them.

① Connection procedure information (hook-on, hook-off, dial information, etc.), for the subscribers, in the 11 bits C1 to C11;

② Maintenance information, for the subscribers, in the 3 bits M1 to M3;

③ Alarm information for the RT side of SLC96 in the 2 bits A1 and A2; and

④ Switching procedure information for the spare T1 line in the 4 bits S1 to S4.

In practice, Ft bits (not shown) consisting of the fixed pattern (101010 . . . ) are added between the sync data shown in FIG. 4 and the Fs bits comprising the information items ① to ④ described above. Therefore, the total number of bits becomes 72 bits and the cycle is 9 ms.

The informational ① to ④ described above are transmitted and received by one transmission line having a 72-frame structure as is the information for all the subscribers accommodated in each RT shown in FIG. 1. (A transmission line having a 12-frame structure transmits only voice information.) Among the information ① to ④, three subscriber connection procedure information ① (33 bits) in a 9 ms cycle constitute one message.

Accordingly, the control processor CPR must scan each DTC in the 9 ms cycle which is the reception cycle for the information ① by each of DTC1 to DTC3 shown in FIG. 1, and processing by software is therefore executed.

When the connection procedure information for the subscribers is processed in the 9 ms cycle by the software in the SLC96 interface as described above, there exists the problem that the load on the control processor increase when the number of the SLC96 interfaces accommodated in the switching center increases.

When the processing of the message described above is executed by the data terminal DT (or by the DT controller DTC) on the side of the switching center, a microprocessor becomes necessary but in this case, too, the number of microprocessors increases when the number of the SLC96 interfaces connected to the system increases, so that the system cost increases.

The present invention is directed to providing a message bit terminating system in the SLC96 interface which can reduce the load on the control processor by efficiently processing the message information at the SLC96 interface, as described above, and can also reduce the cost of the system.

Figure 5:
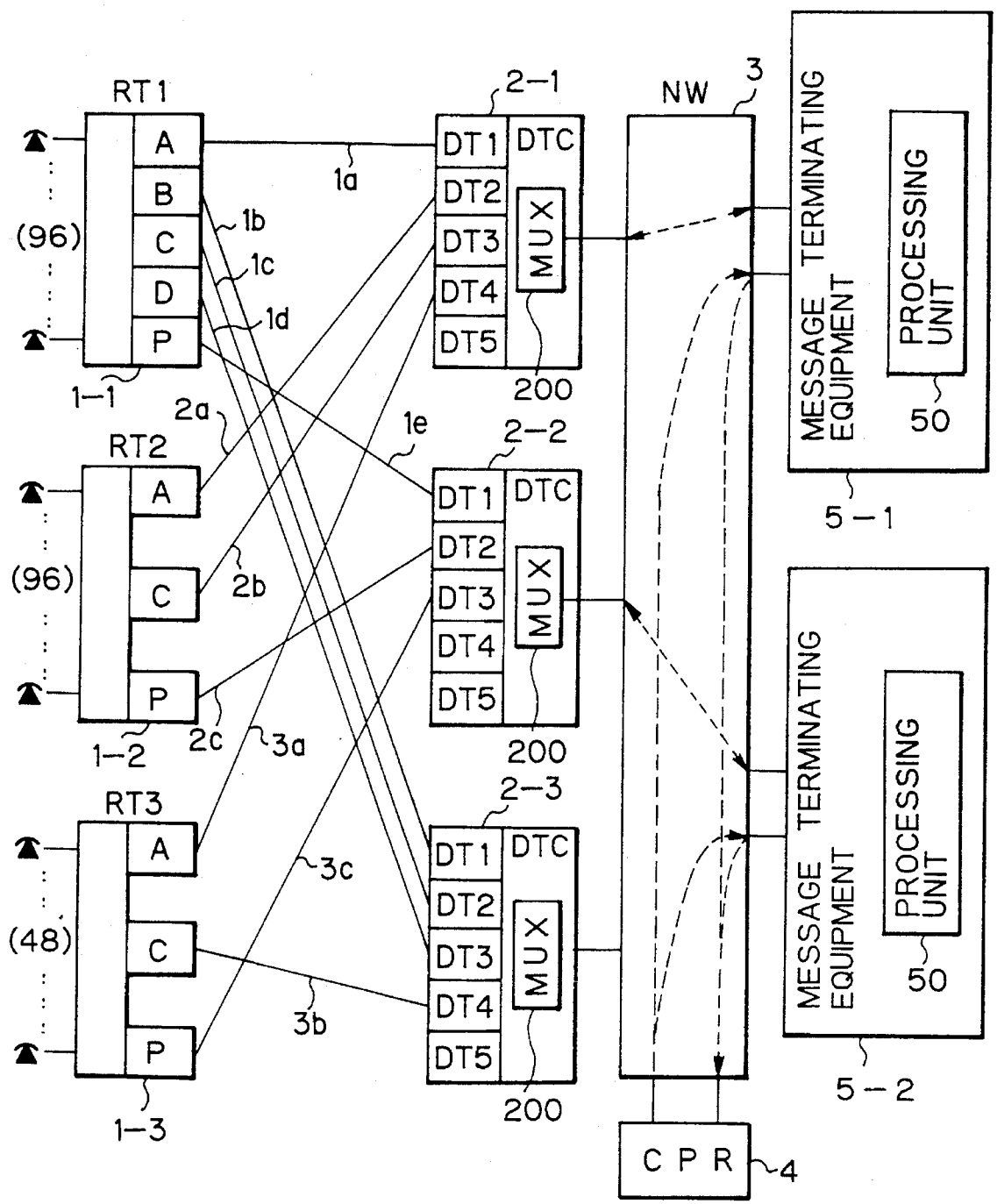
FIG. 5 is a view showing the systematic structure of the operational principle in accordance with the present invention.

FIG. 5 is a system structural view showing the principle of the present invention.

In FIG. 5, reference numerals 1-1 to 1-3 denote remote stations RT-1 to RT3 in the three modes (see FIG. 2) of the SLC96 interface, reference numerals 1a to 1e, 2a to 2c and 3a to 3c denote transmission lines in the SLC96 interfaces for connecting the remote stations 1-1 to 1-3 to the switching center, reference numerals 2-1 to 2-3 denote data terminal units each comprising a plurality of data terminals DTs and one DT controller (DTC) and disposed at the switching center, reference numeral 200 denotes a multiplexing unit disposed for each DTC, reference numeral 3 denotes a network (NW), reference numeral 4 denotes a control processor (CPR) and reference numerals 5-1 and 5-2 denote message terminating equipment. Reference numeral 50 denotes a processing unit provided in each message terminating equipment.

In the present invention, the transmission line for transmitting the message information between each remote station and the switching center is separated from other transmission lines on outside the switching center and is concentratedly accommodated in the same data terminal unit, the message information thus gathered is transmitted to the message terminating equipment provided to a network, through the network, and the message terminating equipment processes the information, detects the content of each message information and reports to the control processor.

Among the transmission lines for each remote station 1-1 to 1-3, the transmission lines of the existing 72-frame structure which handle the message information of the subscribers are all accommodated in the same data terminal unit 2-1 of the switching center, and the transmission lines of the 12-frame structure of each remote station are separated from the transmission lines of the 72-frame structure and are accommodated in another data terminal 2-3. The spare transmission lines (P) handling the message information in case of trouble are all accommodated in still another terminal unit 2-2.

When each data terminal unit 2-2, 2-3 receives the message information from each remote station 1-1 to 1-3 at its data terminal DT, it supplies the message information to the DTC (data terminal controller). The multiplexing unit 200 of the DTC gathers a plurality of message information from each remote station and transmits it to the corresponding message terminating equipment 5-1, 5-2 through the speech channel of the network 3. Since the sync data received at this time is by itself utilized by the DT, this sync data is not transmitted to the message terminating unit, and this sync data portion is used for inserting quality information for the transmission line (for indicating detection of abnormal synchronization, etc.) and check data for confirming the normality of the switching line inside the network between the DTC and the message terminating equipment.

Each message terminating equipment 5-1, 5-2 is provided with a processing unit 50 for processing the data and analyzes the message information, from each remote channel, which it receives through the speech channel. When it determines that the message information is data, the message terminating equipment sends it to the control processor (CPR) 4. Upon receiving this data, the control processor (CPR) processes it.

The message information transmitted to each remote station from the control processor 4 (CPR) is sent to the message terminating equipment 5-1, 5-2, and is sent to the corresponding data terminal unit 2-1, 2-2 by the message terminating equipment 5-1, 5-2 through the network, and the message information from each remote station is separated by the DTC. Thereafter, the message information is transmitted from the DT corresponding to each remote station to the transmission line.

As to the connection information for the subscribers (three transmissions constitute one message) in the message information, the report is made when the three messages are normally received. Therefore, the processing cycle of the software becomes three times larger, and the load on the processor can be reduced. Furthermore, in comparison with the case where each data terminal is provided with a processing function (microprocessor), and individually executes processing, the present invention can reduce the cost of the system because only the message terminating equipment needs be provided with a processing function.

Figure 6B:
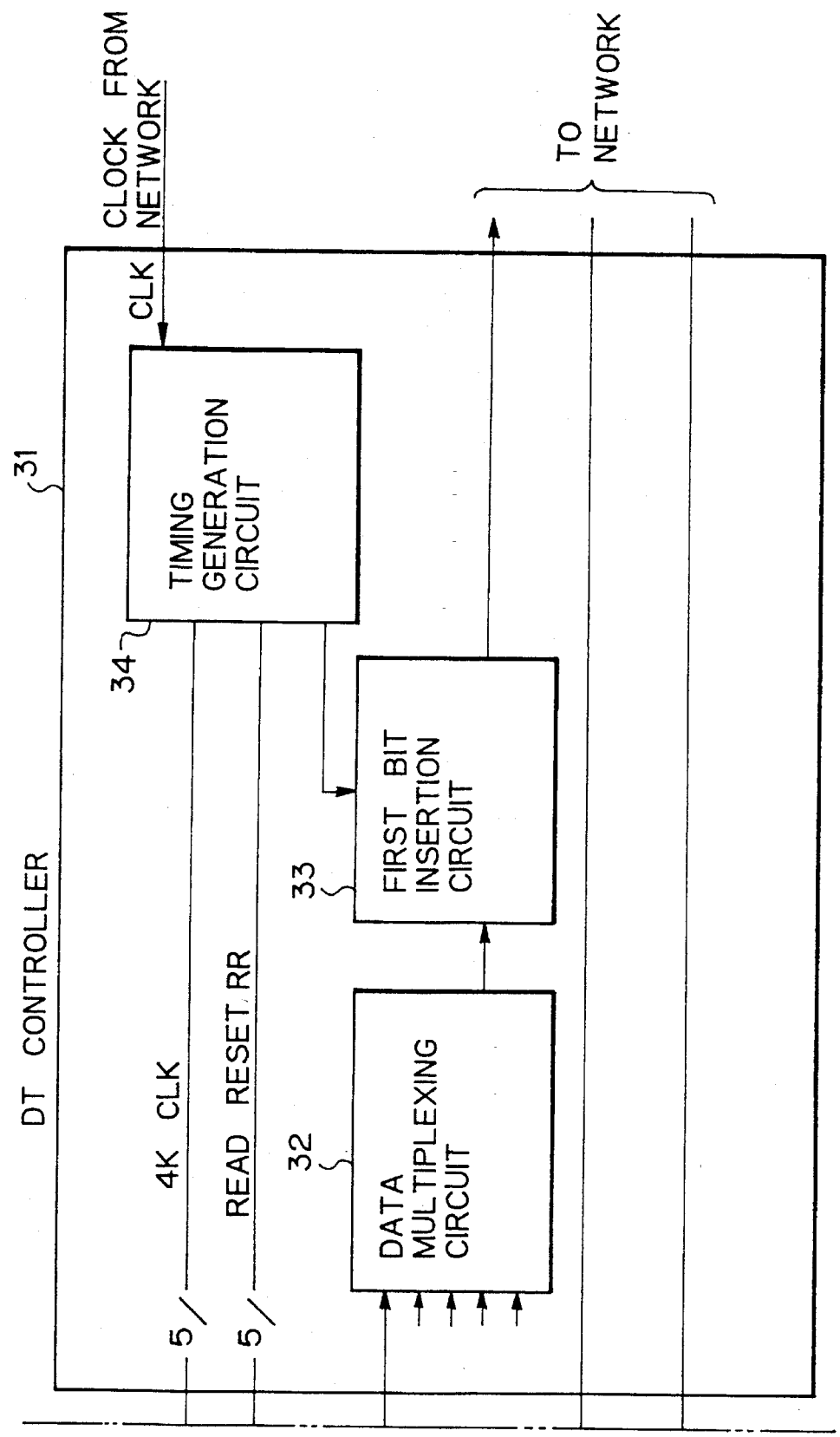
Figure 8:
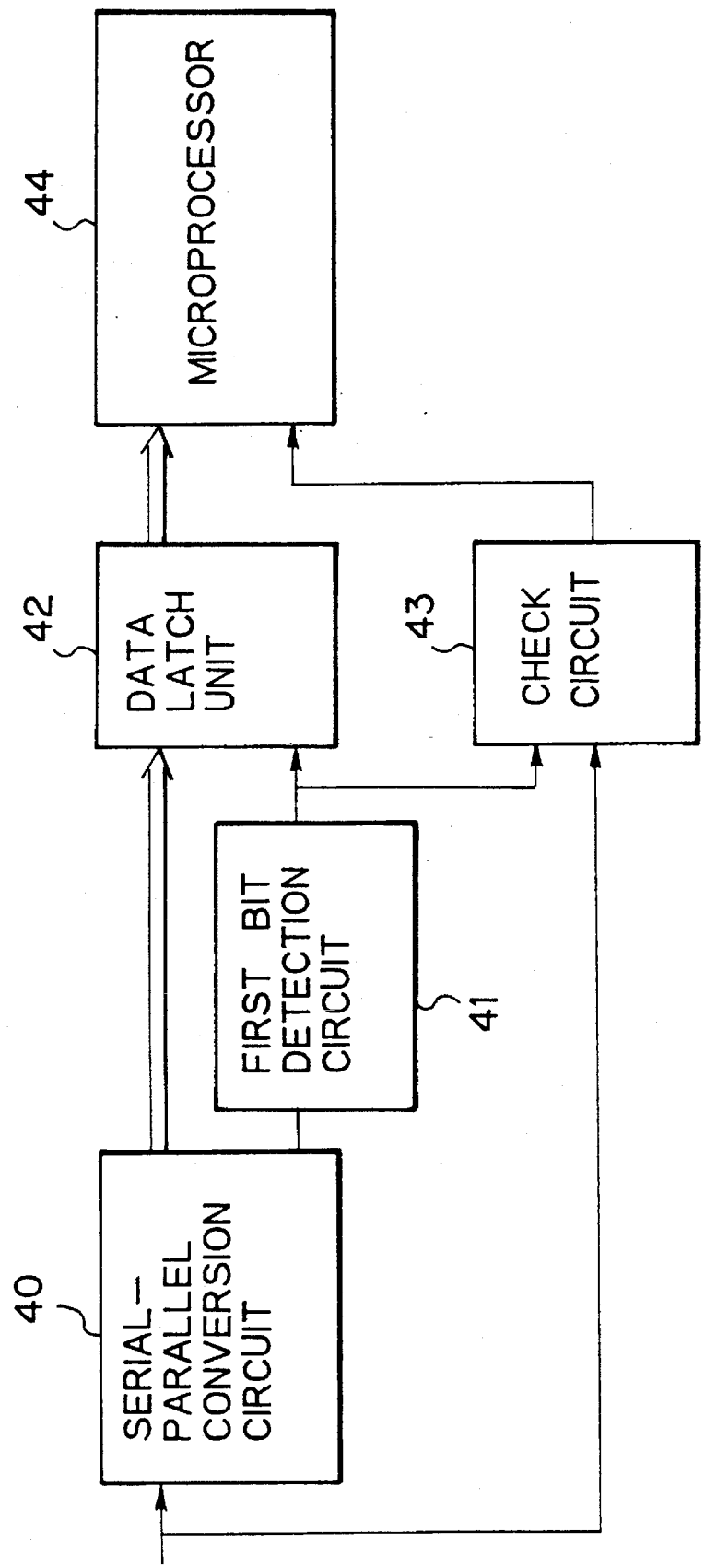
FIG. 8 is a block diagram showing the message terminating equipment in accordance with the present invention.

FIG. 6 is a structural view of an embodiment of DTs and DTCs in a switching center, FIG. 7 shows the format of an interface between the DTC and the terminating equipment, and FIG. 8 is a structural view of a message terminating equipment.

In FIG. 6, reference numeral 20 denotes a data terminal (DT) connected to a transmission line for transmitting message information for one remote station, reference numerals 21 to 26 denote circuits for receiving the information from the remote station, and reference numerals 27 to 30 denote circuits on the transmission side for transmitting signals to the remote station. Reference numeral 31 denotes a DT controller (DTC), and reference numerals 32 to 34 denote circuits for sending a message to message terminating equipment (5-1 and 5-2 in FIG. 5). In this embodiment, only one DT 20 connected to the DTC 30 is shown disposed, but four other DTs, not shown in the drawings, are also connected. In other words, five DTs, in all, are connected to this DTC.

A frame signal transmitted from the counterpart remote station connected to the DT20 by the transmission line is inputted in the 72-frame configuration shown in FIG. 3. Since the signal on the transmission line is subjected to bipolar encoding, it is converted to a unipolar signal in a B/U conversion circuit 21. At this time, a clock extraction circuit 22 extracts a clock signal (1.544 MHz). Since the unipolar signal is encoded by a transmission code (AMI or other known codes such as B8ZS), it is converted to an NRZ signal by a line code conversion circuit 23, and is then supplied to the frame synchronization/multi-frame synchronization control circuit 24.

This frame/multi-frame synchronization control circuit 24 detects sync bits (framing bits), detects a multi-frame sync pattern (see FIG. 4) in them and extracts subsequent message data (information). It also generates a 16 KHz clock signal for controlling a well-known elastic store (ES) 26 for the next stage and a write reset signal (WR). This write reset signal (WR) is a control signal which designates the address of an address 0 when data is written into the elastic store 26. In the frame/multi-frame synchronization control circuit 24, each of 24 data signal (voice signal) channels is separated and is output to the network (3 in FIG. 5) through the DTC 31. After switching is effected in the network, a signal is supplied to the message terminating equipment.

When an alarm detection circuit 24a detects bipolar violation (which represents an abnormality in synchronization and a switch to a spare transmission line is made when this violation occurs) of a coding rule for the line code from the signal inputted from the line code conversion circuit 23, an alarm insertion circuit 25 is activated. This alarm insertion circuit 25 inserts the bipolar violation information and a check bit pattern (a fixed pattern) for confirming normalcy of the data at the time of switching, as the message data to the elastic store 26, into a portion of the sync data (the leading part in FIG. 4), and then writes the data into the elastic store 26.

The message data written into the elastic store 26 is executed by the clock (CLK) supplied from the timing generation circuit 34 of the DTC 31.

The timing generation circuit 34 generates a 16 KHz clock for reading and a read reset signal (RR) on the basis of the clock from the network. This read reset signal is a control signal for designating the address 0 for reading the data from the elastic store 26. In this way, the time at which the leading part of the message data is read out from the elastic store 26 of the DT 20 is controlled by the DTC 31.

Besides the DT 20 shown in the drawing, the DTC 31 supplies the clocks for reading and the read reset signals (RR) to four DTs. In other words, it reads out the message data from five DTs in all in such a manner that the timing of their leading portions is in alignment with one another. The message data read out from each DT is multiplexed by the data multiplexing circuit 32 and after a bit representing the leading part of the message data is inserted in the next first bit insertion circuit 33, the multiplex data is sent to the network.

The format of an interface between the DTC and the message terminating equipment will be explained with reference to FIG. 7. The message data read out from the elastic store of each of the five DTs is multiplexed by the data multiplexing circuit 32 in such a manner that it is inserted into B1 to B5 of the data having the 8-bit structure shown in FIG. 7. In FIG. 7, each of the frames 0, 1, 2, . . . and so forth represents the eight bits that are transmitted at one time through the communication channel established between the DT and the message terminating equipment. The frame 0 is the frame wherein the leading data (one bit) of the five message generated in the five DTs are stored in the bits B1 to B5. To represent that the leading data are stored, "1" is set to the B6 bit of this frame 0.

The insertion of the leading bit is carried out by the first bit insertion circuit 33 shown in FIG. 6, and "0" is always set in B6 of the other frames. By the way, although FIG. 7 shows frames 0 to 15, frames actually exist up to the frame 35 (or 36 frames, in total) so as to send all the framing bits shown in FIG. 4 (frames 16 et seq. being omitted from the drawing).

Next, the reception operation of the message data from the message terminating equipment in the construction shown in FIG. 6 will be explained. The message data are transmitted from the message terminating equipment to the five data terminals in the format shown in FIG. 7, and the first bits are inserted into these message data. The DTC 31 sends out the data in the through-type system to a plurality of data terminals.

Each DT20 receives this data at the time allotted thereto, stores it in the message data latch circuit 28, selects the bit address, and separates the message bit from the first bits. The message separated in this way is supplied to the frame synchronization/multi-frame synchronization generation circuit 27 and is inserted into the communication data (voice data) inputted from the network at the position of the channel definition (the frame bit position) for multiplexing the framing bits. In this way, the message data is converted to a 24-channel PCM link format having the 72-frame configuration. This data is the NRZ signal, which is converted to the unipolar signal by the next line code conversion circuit 29, is further converted from the unipolar signal to the bipolar signal by the U/B conversion circuit 30 and is sent to the transmission line.

FIG. 8 is a structural view of the principal portions of the terminating equipment.

In FIG. 8, reference numeral 40 denotes a serial-parallel conversion circuit, 42 denotes a data latch unit for storing the message data from a plurality of data terminals (DTs), 43 denotes a check circuit for confirming the sync data, and 44 denotes a microprocessor. When a path through the network with the DTC is extended under the control of a control processor (CPR), the terminating equipment transmits and receives the message information transmitted through this path as shown in FIG. 7. This drawing shows the structure for receiving and processing the message data transmitted from the DTC but the structure for transmitting the message data to the DTC is omitted.

When the message data are sequentially inputted to the switching network in the format shown in FIG. 7, each frame (eight bits) is converted to a parallel format by the serial-parallel conversion circuit 40. When the sixth bit becomes "1", the first bit detection circuit 41 generates a detection signal and this signal is supplied to the data latch unit 42 and the check circuit 43. The data latch unit 42 stores the message information switched from the DTC, and the check circuit 43 stores the sync data and checks the pattern.

The microprocessor 44 takes out the message data from each data terminal from the data latch unit 42, checks the connection procedure information with subscriber information (11 bits from C1 to C11), maintenance information for subscribers (3 bits of M1 to M3), the alarm information on the remote side (2 bits of A1 and A2) and the switching procedure information to the spare T1 line (4 bits of S1 to S4), or 20 bits in total, and after detecting that they are normal message data, the microprocessor 44 sends the result to the control processor CPR (4 in FIG. 5) through the network. When the sync data does not have the pattern shown in FIG. 7, the microprocessor discards the message data.

The microprocessor 44 analyzes the message data from five sets of data terminals. As to the connection information for the subscribers (C1 to C11 represented by 1 in FIG. 4), the microprocessor 44 discriminates that these message data are sent dividedly and sequentially three times in a 9 ms cycle. Detecting that these data are normally received three times, the microprocessor notifies the receipt to the control processor. Therefore, the control processor may execute processing of the connection information for the subscribers within a 27 ms processing cycle.

In the explanation of FIG. 6 given above, the quality of information on the transmission line data and the data for confirming the normality of the switching line between the DTC and the message terminating equipment are inserted using the sync data portion (leading 12 bits in FIG. 7) in the message data inside the DTC 31. In the circuit shown in FIG. 8, however, these information and data for confirming normality cannot be confirmed. In other words, the number of the multiframes between the DTC 31 and the message terminating equipment is increased (36 frames) and the microprocessor 44 executes the detection processing of these information so that the bits of one cycle shown in FIG. 7 can be detected.

The message data to be transmitted from the control processor CPR (4 in FIG. 5) to each data terminal is sent to the message terminating equipment through the network. When the message terminating equipment receives the message data, the data for five sets of the data terminals are multiplexed in the format shown in FIG. 7 and are then transmitted to the data terminals shown in FIG. 6 and are received by each DT by the circuits shown in FIG. 6 as already described.

We claim:

1. A message information terminating system in a switching center connected to a plurality of remote stations each accommodating a plurality of subscribers by respective interface means, comprising:

a plurality of transmission lines each carrying message information containing various types of information by framing bits, between said switching center and each of said remote stations, and being accommodated in a same data terminal unit of said switching center;

message terminating equipment provided with a processing unit for analyzing said message information, and included in a network located at said switching center;

said data terminal unit gathering message information from said remote stations and transmitting said message information to said message terminating equipment through said network; and said message terminating equipment separating said message information from each of said remote stations, analyzing said message information using said processing unit, and reporting normal message information to a control processor of said switching center when said message terminating equipment detects said normal message information.

2. A message information terminating system according to claim 1, wherein message information transmitted from said switching center to each of said remote stations is reported by said control processor to said message terminating equipment, and when said message terminating equipment sends said message information to said data terminal unit through said network, said data terminal unit transmits said message information to each of said remote stations.

3. A message information terminating system according to claim 1, wherein said data terminal unit includes a plurality of data terminals connected to a transmission line connected to each of said remote stations, and includes a data terminal controller for controlling said plurality of data terminals, each of said data terminals being equipped with a memory unit into which said message information from each of said remote stations is written, and said data terminal controller sequentially reads out said message information from said memory unit of each of said data terminals from the leading bit thereof, multiplexes the read information of said plurality of data terminals and transmits said information which has been multiplexed to said message terminating equipment.

4. A message information terminating system according to claims 1 2, or 3, wherein message data transmitted and received between said data terminal unit and said message terminating equipment is transmitted as a plurality of frames using a communication channel of said network, positions for a predetermined number of bits of each of said frames being allotted for the message data of each of said remote stations, respectively, and a bit representing a leading bit of said message data is stored at a position of one bit.

5. Message information terminating equipment in a switching center including a data terminal controller and a microprocessor, said message information terminating equipment comprising:

serial/parallel conversion means for receiving frames of message data in serial format from remote stations and converting all data in said frames to parallel format;

a check circuit connected to said serial/parallel conversion means;

data latch means connected to said serial/parallel conversion means;

first bit detection means connected to said serial/parallel conversion means, for generating a detection signal and delivering said detection signal to said data latch means and said check circuit;

said data latch means storing message data from a plurality of data terminals, said data terminals respectively receiving message data of one of said remote stations;

said check circuit being connected to said microprocessor and receiving said detection signal of said first bit detection means and message data from said data terminal controller and sorting sync data to check for a specified pattern of said synch data; and said microprocessor being connected to said data latch means and to said check circuit, for fetching said stored message data from said data latch means to check information including connection procedure information and subscriber information, maintenance information for subscribers, alarm information on a remote station side, and switching procedure information to switch to a spare line, and for detecting from said pattern whether or not a predetermined number of bits are normal message data and sending a detected result to a control processor, when said synch data is not in said specified pattern said control processor discarding the message data.

6. A message information terminating system in a switching center connected to a plurality of remote stations accommodating a plurality of subscriber stations via a plurality of transmission lines, comprising:

an interface, connected to the transmission lines, on which a plurality of multiplexed channels following a leading bit form one frame, and a plurality of frames form one multiframe for receiving information from the subscriber stations via each channel and message information including synchronizing data and supervisory data via a series of the leading bits;

a multiplexer for detecting the series of leading bits via each of the transmission lines upon establishing synchronization by the synchronizing data, and for multiplexing a plurality of the series of the leading bits; and a message terminator for receiving the multiplexed series of leading bits and for analyzing the message information formed by the series of leading bits.

* * * * *